(12) United States Patent
Gunasekaran et al.

(10) Patent No.: US 12,535,146 B2
(45) Date of Patent: Jan. 27, 2026

(54) SAFETY VALVE HARNESSING WEIGHT AND GRAVITY FOR FAIL-SAFE CLOSURE

(71) Applicant: Halliburton Energy Services, Inc., Houston, TX (US)

(72) Inventors: Mohan Gunasekaran, Singapore (SG); Nithin Kumar Gupta Dachepally, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 117 days.

(21) Appl. No.: 18/388,950

(22) Filed: Nov. 13, 2023

(65) Prior Publication Data
US 2025/0154853 A1    May 15, 2025

(51) Int. Cl.
 *F16K 17/00* (2006.01)
 *E21B 34/10* (2006.01)
 *E21B 34/14* (2006.01)

(52) U.S. Cl.
 CPC ............ *F16K 17/00* (2013.01); *E21B 34/102* (2013.01); *E21B 34/14* (2013.01); *E21B 2200/05* (2020.05); *E21B 2200/06* (2020.05)

(58) Field of Classification Search
 CPC .... E21B 34/14; E21B 34/102; E21B 2200/06; E21B 2200/05; F16K 17/00
 See application file for complete search history.

(56) References Cited

U.S. PATENT DOCUMENTS

| | | | |
|---|---|---|---|
| 1,765,864 A * | 6/1930 | Corey ................... | E21B 31/107 166/216 |
| 4,262,693 A | 4/1981 | Giebeler | |
| 4,834,183 A * | 5/1989 | Vinzant ................. | E21B 34/102 166/321 |
| 5,996,687 A | 12/1999 | Pringle et al. | |
| 6,619,388 B2 * | 9/2003 | Dietz .................... | E21B 34/066 166/66 |
| 8,393,386 B2 * | 3/2013 | Lake ..................... | F16K 31/082 166/66.5 |
| 2006/0284134 A1 | 12/2006 | Dwivedi | |

(Continued)

FOREIGN PATENT DOCUMENTS

WO    2010123587 A2    10/2010

OTHER PUBLICATIONS

International Search Report and Written Opinion for PCT/US2023/080771.

*Primary Examiner* — Neel Girish Patel
(74) *Attorney, Agent, or Firm* — The Hilton Firm PLLC

(57) ABSTRACT

A safety valve includes a rotatable helical slot cylinder having a body and a throughbore running axially through the body. The helical slot cylinder additionally has an upper helical slot and a lower helical slot slotted in the body of the helical slot cylinder and the helices of the upper helical slot and the lower helical slot are the inverse of each other. The upper sleeve is coupled to the upper helical slot of the helical slot cylinder and has a throughbore. The lower sleeve is coupled to the lower helical slot of the helical slot cylinder and has a throughbore. The upper sleeve and the lower sleeve are disposed within the throughbore of the helical slot cylinder. The safety valve additionally includes a weighted component directly or indirectly coupled to the upper sleeve and a flapper assembly directly or indirectly coupled to the lower sleeve.

5 Claims, 3 Drawing Sheets

(56) References Cited

U.S. PATENT DOCUMENTS

| | | | |
|---|---|---|---|
| 2010/0139923 A1* | 6/2010 | Biddick | E21B 34/10 |
| | | | 166/332.8 |
| 2013/0199791 A1* | 8/2013 | Hill, Jr. | E21B 34/06 |
| | | | 166/332.8 |
| 2014/0144642 A1* | 5/2014 | Lindsay | E21B 23/006 |
| | | | 166/308.1 |
| 2015/0300124 A1* | 10/2015 | Mailand | E21B 34/102 |
| | | | 166/332.8 |
| 2021/0087899 A1 | 3/2021 | DeBerry et al. | |
| 2024/0117709 A1* | 4/2024 | Gonzalez | F16K 43/001 |
| 2025/0154853 A1* | 5/2025 | Gunasekaran | E21B 34/14 |

\* cited by examiner

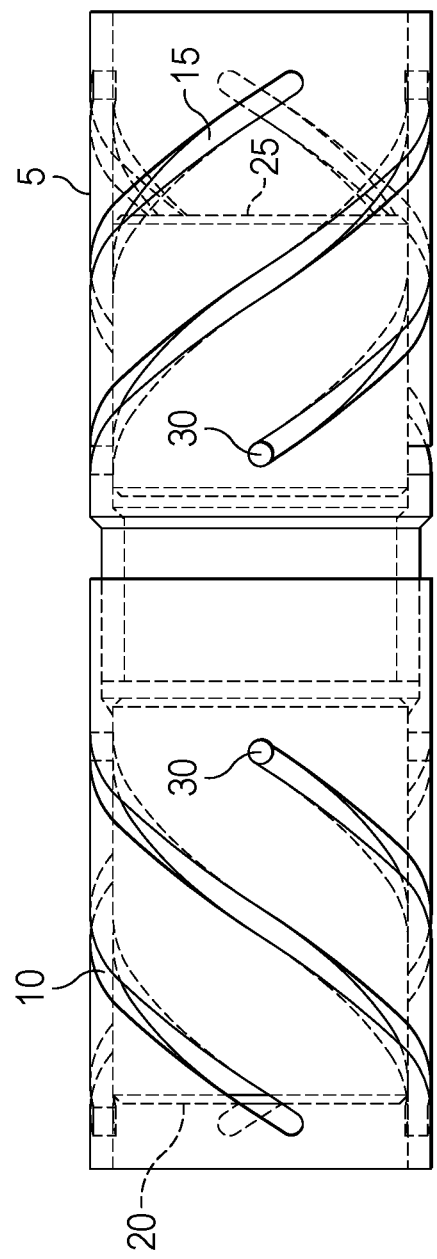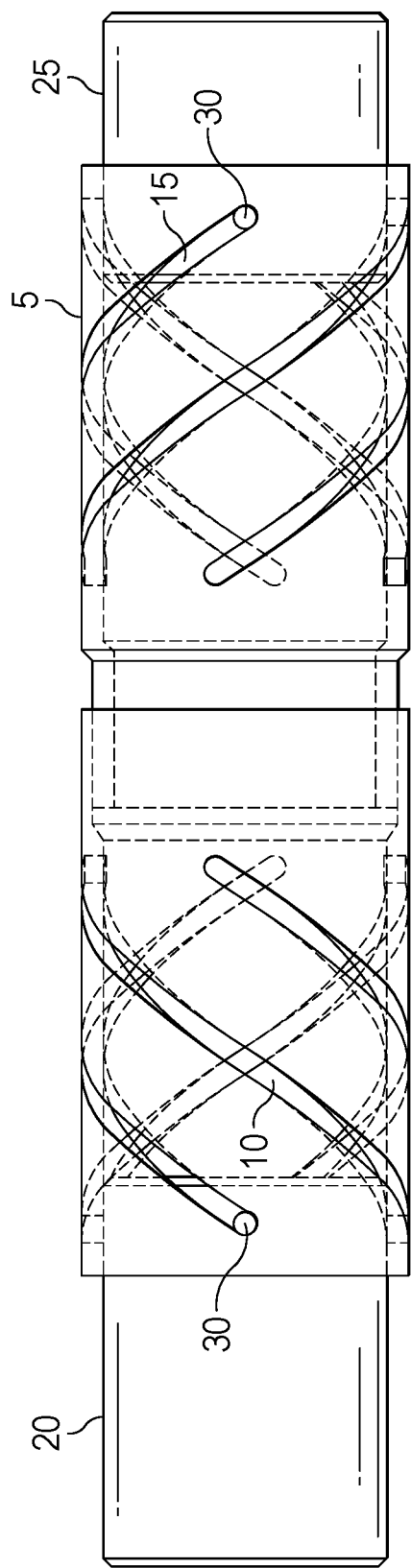

SAFETY VALVE HARNESSING WEIGHT AND GRAVITY FOR FAIL-SAFE CLOSURE

TECHNICAL FIELD

The present disclosure relates generally to wellbore operations, and more particularly, to the use of a safety valve that harnesses gravity and the weight of a flow tube to perform a fail-safe closure of the safety valve without the need for a spring.

BACKGROUND

For some wellbore operations, it may be desirable to use a safety valve to prevent the uncontrolled release of wellbore fluids to the surface. Should surface or wellbore equipment suffer a failure, the fail-safe mechanism of the safety valve may force the safety valve closed, thereby preventing the uncontrolled release of wellbore fluids on the surface potentially leading to an environmental disaster and/or safety risks to wellbore personnel. Safety valves utilize springs as part of the fail-safe mechanism to force the valve closed. However, springs may not be the best option for all wellbore environments.

Safety valves are an important part of wellbore operations. The present invention provides improved apparatus and methods for the use of a safety valve that harnesses gravity and the weight of a flow tube to perform a fail-safe closure of the safety valve without the need for a spring.

BRIEF DESCRIPTION OF THE DRAWINGS

Illustrative examples of the present disclosure are described in detail below with reference to the attached drawing figures, which are incorporated by reference herein, and wherein:

FIG. 1 is a schematic illustrating the use of a helical joint mechanism in accordance with one or more examples described herein;

FIG. 2 is a schematic continuing the illustration of the use of the helical joint mechanism of FIG. 1 in accordance with one or more examples described herein;

Figure 3:
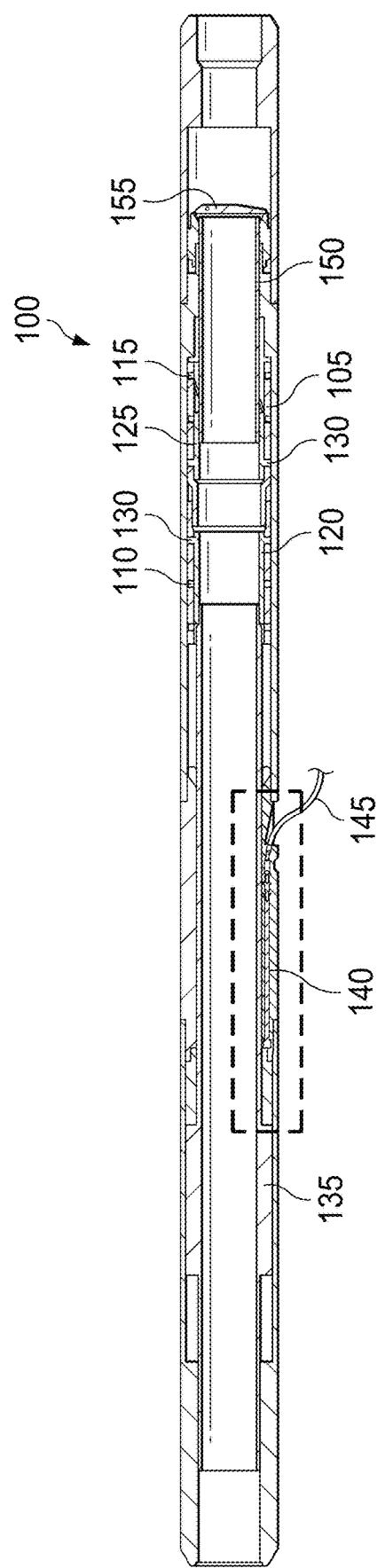
FIG. 3 is a schematic illustrating of the use of the example safety valve in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a safety valve that harnesses gravity and the weight of a flow tube to perform a fail-safe closure of the safety valve without the need for a spring.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms upstream and downstream may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

The present disclosure relates generally to wellbore operations, and more particularly, to the use of a safety valve that harnesses gravity and the weight of a flow tube to perform a fail-safe closure of the safety valve without the need for a spring. Advantageously, the safety valve does not utilize a spring for its fail-safe mechanism. As such, the safety valve may avoid potential issues that may affect a spring such as extreme temperatures and long-term deployment. An additional advantage is that the safety valve utilizes gravity and the weight of an adjacent component, such as a flow tube, to force the safety valve closed. The gravity and component weights are immutable characteristics and will not be affected by external wellbore factors or degrade over time. As such, the fail-safe mechanism can be expected to function similarly in all wellbore environments over time. In some wells, such as carbon capture, utilization, and storage wells, the wellbores of these wells may comprise lower temperatures relative to other well types. Moreover, these wells may be expected to operate under these cold environments for long periods of time. The safety valves disclosed herein may be utilized for these well types to provide a reliable fail-safe in these more extreme wellbore conditions. As another advantage, the fail-safe mechanism utilizes a dual sliding sleeve with inverse helical grooves. The dual sliding sleeve replaces the spring mechanism present in a traditional safety valve. In a traditional safety valve, the inner diameter for the throughbore of the safety valve is sized to accommodate the flapper seat and the spring. As the safety valves of this disclosure do not utilize a spring, a larger size for the throughbore (i.e., a larger inner diameter) may be used as compared to safety valves having spring operated fail-safe mechanisms. Additionally, the safety valve may be customized by adjusting the adjacent component (e.g., a flow tube) to increase or decrease the weight as desired. This customization may be performed by substituting the adjacent component with one of different length or of different material. Unlike safety valves with spring operated fail-safes, the inner or outer diameter need not be adjusted. Instead, the adjacent component can be changed to adjust the weight as needed without the need to retrofit a new spring inside the safety valve. One other advantage is that the dual sleeve mechanism may be made of hard plastics or other similar materials that possess excellent sealing properties, thereby preventing leaks or similar problems.

The safety valves disclosed herein may be installed in wellbore conduits and used within a variety of well sites including those comprising land or subsea well sites. The safety valves may be used in a variety of wellbores including, but not limited to, horizontal wellbores, vertical wellbores, deviated wellbores, and the like. The safety valves may be used with a variety of well types including, but not limited to, oil and gas wells, storage wells, geothermal wells, water wells, and the like. If used with a storage well, the storage wells may be used to store water, oil, gas, or other fluids. The storage wells may be used for carbon capture and/or long term storage of fluids. Some of the wells in which the safety valves are used may have a wellbore temperature below about −40° F. to about −80° F. at the location of the safety valve.

FIG. 1 is a perspective figure illustrating the helical joint mechanism of a safety valve for use in examples of the present invention. A rotatable helical slot cylinder 5, illustrated translucently for improving the clarity of the illustration, possesses a body having a throughbore running axially through the body. The helical slot cylinder 5 comprises two helical slots which are cut into the body. The upper helical slot 10 is the left most helical slot and the lower helical slot 15 is the right most helical slot. The upper helical slot 10 is uphole of the lower helical slot 15. Although FIG. 1 illustrates multiple upper helical slots 10 and lower helical slots 15, it is to be understood that the only one each of upper helical slot 10 and lower helical slot 15 may be used in some examples.

The upper helical slot 10 and the lower helical slot 15 each comprise a helical groove or cut slotted into the body of the helical slot cylinder 5. The helices of the upper helical slot 10 and the lower helical slot 15 are the inverse of one another. For example, if the upper helical slot 10 is a right-handed helix, the lower helical slot 15 will be a left-handed helix and vice versa. The upper helical slot 10 and the lower helical slot 15 may be machined into the helical slot cylinder 5 using any sufficient method or the helical slot cylinder 5 may be manufactured to already comprise the upper helical slot 10 and the lower helical slot 15, for example, through additive manufacturing or a similar process.

An upper sleeve 20 is coupled to the upper helical slot 10 of the helical slot cylinder 5. The upper sleeve 20 is disposed within the helical slot cylinder 5. The upper sleeve 20 comprises a throughbore to allow the flow of fluids through the upper sleeve 20. The upper sleeve 20 may be coupled to the upper helical slot 10 of the helical slot cylinder 5 through any sufficient mechanism. In the example of FIG. 1, a pin 30 extends form the upper sleeve 20 and through the upper helical slot 10 to couple the two together.

A lower sleeve 25 is coupled to the lower helical slot 15 of the helical slot cylinder 5. The lower sleeve 25 is disposed within the helical slot cylinder 5. The lower sleeve 25 comprises a throughbore to allow the flow of fluids through the lower sleeve 25. The lower sleeve 15 may be coupled to the lower helical slot 15 of the helical slot cylinder 5 through any sufficient mechanism. In the example of FIG. 1, a pin 30 extends form the lower sleeve 25 and through the lower helical slot 15 to couple the two together.

The upper sleeve 20 and the lower sleeve 25 are both disposed within the helical slot cylinder 5 proximate to one another. In some examples, upper sleeve 20 and lower sleeve 25 do not overlap with one another or contact each other. In other examples, upper sleeve 20 and lower sleeve 25 overlap and/or contact each other. The helical slot cylinder 5 is rotatable in either direction along its circumference. If the upper sleeve 20 is pushed or pulled in the uphole direction it will partially extend out of the helical slot cylinder 5. As the upper sleeve 20 is forced uphole, the pin 30 is pulled with the upper sleeve 20 and this movement forces rotation of the helical slot cylinder 5 as it is coupled to and locked with the upper sleeve 20 via pin 30. The rotation of the helical slot cylinder 5 occurs because the pin 30 is locked in the upper helical slot 10 such that the uphole translation of the pin 30 along the axis of the helical slot cylinder 5 will force rotation of the helical slot cylinder 5 because the pin 30 can only move uphole via the groove in the body of the helical slot cylinder 5 formed by the upper helical slot 10.

As the upper sleeve 20 is pushed or pulled uphole and rotation of the helical slot cylinder 5 is induced, the lower sleeve 25 is extended out of the helical slot cylinder 5. The lower sleeve 25 is coupled to a downstream component (e.g., a flapper assembly as discussed below) and is not allowed to be pulled uphole due to this coupling. As such, the rotation of the helical slot cylinder 5 will push the lower sleeve 25 out of the helical slot cylinder 5 as it rotates because the helical slot cylinder 5 and the lower sleeve 25 are coupled together via a pin 30. Because the upper helical slot 10 and lower helical slot 15 are the inverse of each other, the rotation of the helical slot cylinder 5 pushes the lower sleeve 25 in the downhole direction even as the upper sleeve 20 is pulled uphole.

FIG. 1 illustrates the helical slot cylinder 5, the upper sleeve 20, and the lower sleeve 25 in their respective positions when the safety valve is in its closed configuration. The closed configuration of the safety valve is the default configuration. In this default closed position, the upper sleeve 20 and the lower sleeve 25 are entirely or mostly within the throughbore of the helical slot cylinder 5. In some examples, the upper sleeve 20 and/or the lower sleeve 25 may remain partially outside of the helical slot cylinder 5, but should not extend far enough to induce opening of the flapper of the flapper assembly that is discussed below. In the illustration of FIG. 1, the lower sleeve 25 is not extending out of the helical slot cylinder 5 with sufficient force to actuate the downhole flapper assembly.

FIG. 2 is a perspective figure illustrating the helical joint mechanism of a safety valve for use in examples of the present invention. The safety valve configuration illustrated by FIG. 2 is the open configuration and FIG. 2 illustrates the positions for the helical slot cylinder 5, the upper sleeve 20, and the lower sleeve 25 to achieve this open configuration. This configuration is not the default configuration of the safety valve. In FIG. 2, the rotatable helical slot cylinder 5 of FIG. 1, has been rotated to extend the upper sleeve 20 and the lower sleeve 25 out of the interior of the body of the helical slot cylinder 5. As discussed above, a weighted component (not illustrated in FIG. 2) is pushed or pulled against the force of gravity to translate the upper sleeve 20 in the uphole direction along the axis of the safety valve. As discussed above, this movement induces the upper sleeve 20 to extend out of the throughbore of the helical slot cylinder 5. As the upper sleeve 20 is forced out of the helical slot cylinder 5, the helical slot cylinder 5 rotates to accommodate the pin 30 also being pulled uphole. As the pin 30 is pulled uphole, the helical slot cylinder 5 is forcibly rotated due to the pull of the pin 30 in the groove forming the upper helical slot 10. Analogously, the lower sleeve 25 is forced out of the throughbore of the helical slot cylinder 5, but in the downhole direction as the lower helical slot 15 is the inverse of the upper helical slot 10 and so rotation of the helical slot cylinder 5 will guide movement of the pin 30 of the lower sleeve 25 in the downhole direction.

The downhole movement of the lower sleeve 25 may be used to apply pressure to a downhole component such as to a flapper assembly (illustrated in FIGS. 3 and 4 below). The actuated flapper assembly opens a flapper allowing for fluid flow through the safety valve. The fluid is allowed to flow through the component part of the safety valve including the helical slot cylinder 5, the upper sleeve 20, and the lower sleeve 15. The flapper is typically configured to open against the fluid flow so that the flow of wellbore fluids can assist in inducing closure of the flapper when the pressure applied by the lower sleeve 25 is removed. However, in some examples, the flapper may alternatively be configured to open with the flow instead of against the flow of wellbore fluids.

As the configuration illustrated by FIG. 2 is the non-default open configuration, the illustrated components will revert to the default closed configuration of FIG. 1 when the hydraulic pressure supplied to move the weighted component is removed. When the weighted component is no longer forced to an uphole position against the force of gravity, gravity in conjunction with the weight of the weighted component forces the weighted component back to its original default downhole position. In turn, the upper sleeve 20 will be moved to its default position and it will be pushed downhole and inward of the helical slot cylinder 5. In some examples, the upper sleeve 20 may be pushed by the weighted component such that it resides entirely with the helical slot cylinder 5. In other examples, the upper sleeve 20 may still partially reside outside of the helical slot cylinder 5. As the rotatable helical slot cylinder 5 is coupled to the upper sleeve 20 via pin 30, the helical slot cylinder 5 is rotated in the opposite direction used to extend the upper sleeve 20. This rotation will also retract lower sleeve 25 back uphole and into the throughbore of the helical slot cylinder 5. As with the upper sleeve 20, the lower sleeve 25 may be disposed entirely within the helical slot cylinder 5 or a portion of it may remain outside of the helical slot cylinder 5. As the lower sleeve 25 is pulled uphole by the rotation of the helical slot cylinder 5, a flapper assembly (illustrated in FIGS. 3 and 4 below) is disengaged such that the associated flapper is pushed closed by the flow of the wellbore fluids or with a biasing mechanism that biases the flapper to shut when there is no pressure applied to maintain it in the open configuration.

It should be clearly understood that the example system illustrated by FIGS. 1-2 is merely a general application of the principles of this disclosure in practice, and a wide variety of other examples are possible. Therefore, the scope of this disclosure is not limited in any manner to the details of FIGS. 1-2 as described herein.

FIG. 3 is a cross-section illustrating a safety valve 100 for use in examples of the present invention. A rotatable helical slot cylinder 105 possesses a body having a throughbore running axially through the body. The helical slot cylinder 105 comprises two helical slots which are cut into the body. As the present illustration is a cross-section instead of the perspective drawing of FIGS. 1-2, only the cuts for the groove at the extremes of the cylinder are illustrated as the helical slots are obscured by the upper sleeve 120 and the lower sleeve 125. It is to be understood that the helical grooves cut through and wrap around the body of the helical slot cylinder as illustrated below in FIG. 4. In this example, the upper helical slot 110 is the left most helical slot and the lower helical slot 115 is the right most helical slot. The upper helical slot 110 is uphole of the lower helical slot 115.

The upper helical slot 110 and the lower helical slot 115 each comprise a helical groove slotted into the body of the helical slot cylinder 105. The helices of the upper helical slot 110 and the lower helical slot 115 are the inverse of one another. For example, if the upper helical slot 110 is a right-handed helix, the lower helical slot 115 will be a left-handed helix and vice versa. The upper helical slot 110 and the lower helical slot 115 may be machined into the helical slot cylinder 105 using any sufficient method or the helical slot cylinder 105 may be manufactured to already comprise the upper helical slot 110 and the lower helical slot 115, for example, through additive manufacturing, computer numerical control milling, laser cutting, abrasive water jet cutting, or a similar process.

A pin or pins 130 are used to couple the upper sleeve 120 to the helical slot cylinder 105 via the upper helical slot 110. Likewise a different pin or pins 130 are used to couple the lower sleeve 125 to the helical slot cylinder 105 via the lower helical slot 115. The upper sleeve 120 is also coupled to a weighted component 135. The upper sleeve 120 may be coupled to weighted component 135 with any sufficient connection such as a threaded connection. In the illustration of FIG. 3, the weighted component 135 is a flow tube, but it may be any type or design of conduit such that is allows flow through and possesses sufficient weight to keep the upper sleeve 120 in its default unexpanded configuration within the helical slot cylinder 105 until acted upon. If additional weight is desired, the weighted component 135 may be swapped for a heavier or lighter weighted component 135. A piston 140 is coupled to weighted component 135. The piston 140 may be pressurized via a control line 145 used to supply hydraulic pressure to the piston 140. When the piston 140 is pressurized, the piston is pushed uphole, thereby forcing weighted component 135 and consequently upper sleeve 120 to also move uphole along the axis of the safety valve 100. As discussed above in the description of FIGS. 1 and 2, the movement of the upper sleeve 120 will force rotation of the helical slot cylinder 105 which in turn forces movement of the lower sleeve 125 downhole to move out of the helical slot cylinder 105. In the illustration of FIG. 3, the flapper assembly 150 and corresponding flapper 155 are in the default closed position as the connected lower sleeve 125 has not been extended to apply pressure to the flapper assembly 150.

Figure 4:
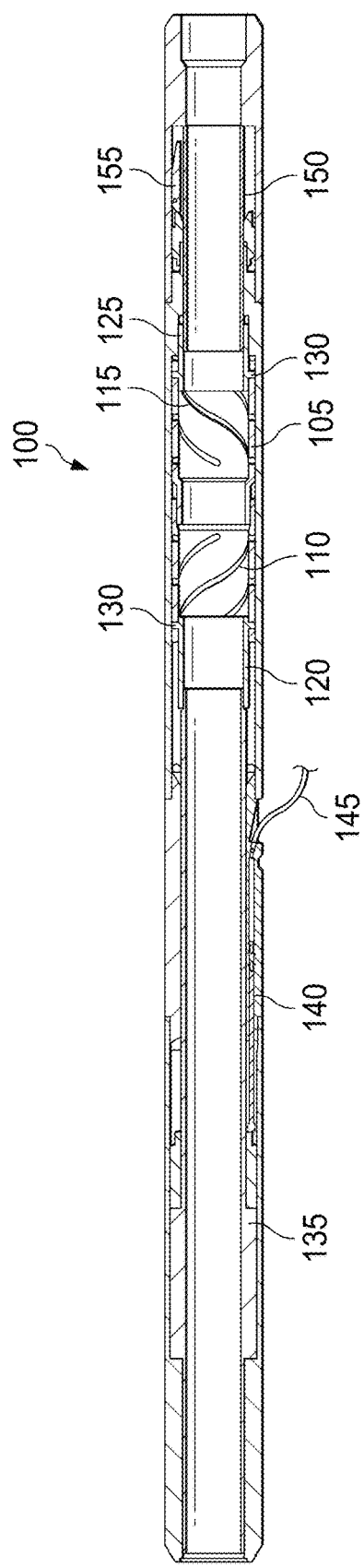
FIG. 4 is a schematic continuing the illustration of the use of the example safety valve of FIG. 3 in accordance with one or more examples described herein.

FIG. 4 is a cross-section illustrating the safety valve 100 of FIG. 3, but in its open configuration. In the illustration of FIG. 4, hydraulic fluid via the control line 145 has pressurized the piston 140. Consequently, the weighted component 135 has been forced uphole against gravity. The coupled upper sleeve 120 is also pulled uphole translating axially along the central axis of the safety valve 105. As the upper sleeve 120 moves uphole, the pin 130 within the upper helical slot 110 induces rotation of the helical slot cylinder 105 to accommodate the upward pull of the pin 130. The rotation of the helical slot cylinder 105 applies a force to the pin 130 of the lower sleeve 125 which is coupled to the lower helical slot 115 of the helical slot cylinder 105. This movement forces the lower sleeve 115 downhole where it applies pressure to the flapper assembly 150. The flapper assembly 150 is pushed downhole and the flapper 155 component of the flapper assembly 150 is forced open. The safety valve 100 is now in its open configuration and fluid is allowed to flow through the safety valve 100 so long as the flapper 155 remains open.

The safety valve 100 may remain in its open configuration as long as sufficient pressure is applied to the weighted component 135 to maintain it in its illustrated position. Should hydraulic pressure be cut to the control line 145 through equipment malfunction, damage, or operator input; gravity will pull the weighted component 135 back to its default downhole configuration as illustrated in FIG. 3. As the weighted component 135 moves to its default downhole configuration, upper sleeve 120 is pushed downhole into helical slot cylinder 105. This movement of the upper sleeve 120 induces rotation of the helical slot cylinder 105 in the opposite direction thereby pulling the lower sleeve 125 uphole and into the throughbore of the helical slot cylinder 105. Uphole movement of the lower sleeve 125 will also release pressure applied to the flapper assembly 150 thereby releasing the flapper 155. Flapper 155 may then close via fluid flow through the safety valve 100 as the flapper 155 opens against the flow of the wellbore fluids. In some optional examples, a biasing mechanism may be used to assist in closing the flapper 155 when the applied pressure is removed. The safety valve 100 is then converted to its closed configuration as illustrated in FIG. 3. It should be noted that no springs are used to open the safety valve 100 of FIGS. 3-4.

It should be clearly understood that the example system illustrated by FIGS. 3-4 is merely a general application of the principles of this disclosure in practice, and a wide variety of other examples are possible. Therefore, the scope of this disclosure is not limited in any manner to the details of FIGS. 3-4 as described herein.

Figure 5:
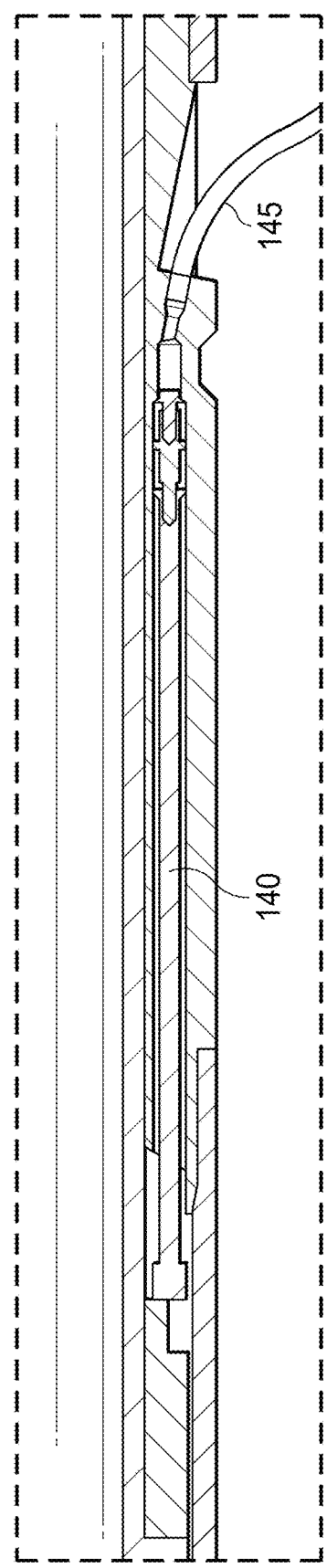
FIG. 5 is an enlarged schematic of a portion of FIG. 3 in accordance with one or more examples described herein.

FIG. 5 is an enlarged cross-section illustrating the portion of safety valve 100 of FIG. 3. In the illustration of FIG. 5, piston 140 and control line 145 are illustrated. Piston 140 may be pressurized via control line 145, which may be used to supply hydraulic pressure to the piston 140. The piston 140 may then act on weighted component 135 as described above.

It should be clearly understood that the example system illustrated by FIG. 5 is merely a general application of the principles of this disclosure in practice, and a wide variety of other examples are possible. Therefore, the scope of this disclosure is not limited in any manner to the details of FIG. 5 as described herein.

The systems disclosed herein may directly or indirectly affect one or more components or pieces of equipment associated with or which may come into contact with the safety valves disclosed herein such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided is a safety valve in accordance with the disclosure and the illustrated FIGs. An example safety valve comprises a rotatable helical slot cylinder having a body and a throughbore running axially through the body. The helical slot cylinder additionally comprises an upper helical slot and a lower helical slot and the upper helical slot and the lower helical slot are slotted in the body of the helical slot cylinder and the helices of the upper helical slot and the lower helical slot are the inverse of each other. The safety valve further comprises an upper sleeve coupled to the upper helical slot of the helical slot cylinder and having a throughbore and a lower sleeve coupled to the lower helical slot of the helical slot cylinder and having a throughbore. The upper sleeve and the lower sleeve are disposed within the throughbore of the helical slot cylinder. The safety valve additionally comprises a weighted component directly or indirectly coupled to the upper sleeve and a flapper assembly directly or indirectly coupled to the lower sleeve.

Additionally or alternatively, the safety valve may include one or more of the following features individually or in combination. The safety valve may be configurable to have a first position and a second position and the first position may comprise the upper sleeve and the lower sleeve extending out of the helical slot cylinder with the flapper open to allow flow through the safety valve. The second position may comprise the upper sleeve and the lower sleeve disposed within the helical slot cylinder with the flapper closed to prevent flow through the safety valve. The safety valve may be configured to shift between the first position and the second position through rotation of the helical slot cylinder. The safety valve may further comprise a control line and the control line may supply hydraulic pressure to push the weighted component against gravity. The rotation of the helical slot cylinder may be induced by pushing the weighted component against gravity. The safety valve may not comprise a spring. The upper sleeve and the lower sleeve may comprise pins that slot into the upper helical slot and the lower helical slot respectively. The weighted component may be a flow tube. The safety valve may be installed in a storage well. The safety valve may be installed in a wellbore of a well having a wellbore temperature from about −40° F. to about −80° F. at the location of the safety valve.

Provided are methods for using a safety valve in accordance with the disclosure and the illustrated FIGs. An example method comprises providing a safety valve comprising a rotatable helical slot cylinder having a body and a throughbore running axially through the body. The helical slot cylinder additionally comprises an upper helical slot and a lower helical slot. The upper helical slot and the lower helical slot are slotted in the body of the helical slot cylinder and the helices of the upper helical slot and the lower helical slot are the inverse of each other. The safety valve additionally comprises an upper sleeve coupled to the upper helical slot of the helical slot cylinder and having a throughbore and a lower sleeve coupled to the lower helical slot of the helical slot cylinder and having a throughbore. The upper sleeve and the lower sleeve are disposed within the throughbore of the helical slot cylinder. The safety valve also comprises a weighted component directly or indirectly coupled to the upper sleeve, and a flapper assembly directly or indirectly coupled to the lower sleeve. The method further comprises applying pressure to the weighted component to push it against gravity thereby pulling the upper sleeve with the weighted component and rotating the helical slot cylinder in a first direction; wherein rotation of the helical slot cylinder also extends the lower sleeve out of the helical slot cylinder; and inducing a flapper of the flapper assembly to open through the extending of the lower sleeve out of the helical slot cylinder.

Additionally or alternatively, the method may include one or more of the following features individually or in combination. The method may further comprise removing the pressure to the weighted component to release the weighted component; whereby releasing the weighted component pushes the upper sleeve into the helical slot cylinder thereby rotating the helical slot cylinder in a second direction that is opposite of the first direction. The method may additionally comprise rotating the helical slot cylinder in the second direction pulls the lower sleeve into the helical slot cylinder and induces a closing of the flapper of the flapper assembly. The safety valve may be configurable to have a first position and a second position and the first position may comprise the upper sleeve and the lower sleeve extending out of the helical slot cylinder with the flapper open to allow flow through the safety valve. The second position may comprise the upper sleeve and the lower sleeve disposed within the helical slot cylinder with the flapper closed to prevent flow through the safety valve. The safety valve may be configured to shift between the first position and the second position through rotation of the helical slot cylinder. The safety valve may further comprise a control line and the control line may supply hydraulic pressure to push the weighted component against gravity. The rotation of the helical slot cylinder may be induced by pushing the weighted component against gravity. The safety valve may not comprise a spring. The upper sleeve and the lower sleeve may comprise pins that slot into the upper helical slot and the lower helical slot respectively. The weighted component may be a flow tube. The safety valve may be installed in a storage well. The safety valve may be installed in a wellbore of a well having a wellbore temperature from about −40° F. to about −80° F. at the location of the safety valve.

Provided are systems for using a safety valve in a wellbore in accordance with the disclosure and the illustrated FIGs. An example system comprises a safety valve comprising a rotatable helical slot cylinder having a body and a throughbore running axially through the body. The helical slot cylinder additionally comprises an upper helical slot and a lower helical slot and the upper helical slot and the lower helical slot are slotted in the body of the helical slot cylinder and the helices of the upper helical slot and the lower helical slot are the inverse of each other. The safety valve further comprises an upper sleeve coupled to the upper helical slot of the helical slot cylinder and having a throughbore and a lower sleeve coupled to the lower helical slot of the helical slot cylinder and having a throughbore. The upper sleeve and the lower sleeve are disposed within the throughbore of the helical slot cylinder. The safety valve additionally comprises a weighted component directly or indirectly coupled to the upper sleeve and a flapper assembly directly or indirectly coupled to the lower sleeve. The system further comprises a conduit in which the safety valve is installed.

Additionally or alternatively, the system may include one or more of the following features individually or in combination. The safety valve may be configurable to have a first position and a second position and the first position may comprise the upper sleeve and the lower sleeve extending out of the helical slot cylinder with the flapper open to allow flow through the safety valve. The second position may comprise the upper sleeve and the lower sleeve disposed within the helical slot cylinder with the flapper closed to prevent flow through the safety valve. The safety valve may be configured to shift between the first position and the second position through rotation of the helical slot cylinder. The safety valve may further comprise a control line and the control line may supply hydraulic pressure to push the weighted component against gravity. The rotation of the helical slot cylinder may be induced by pushing the weighted component against gravity. The safety valve may not comprise a spring. The upper sleeve and the lower sleeve may comprise pins that slot into the upper helical slot and the lower helical slot respectively. The weighted component may be a flow tube. The safety valve may be installed in a storage well. The safety valve may be installed in a wellbore of a well having a wellbore temperature from about −40° F. to about −80° F. at the location of the safety valve.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for operating a safety valve, the method comprises:
   providing a safety valve comprising:
      a rotatable helical slot cylinder having a body and a throughbore running axially through the body; wherein the helical slot cylinder additionally comprises an upper helical slot and a lower helical slot; wherein the upper helical slot and the lower helical slot are slotted in the body of the helical slot cylinder and the helices of the upper helical slot and the lower helical slot are the inverse of each other;
      an upper sleeve coupled to the upper helical slot of the helical slot cylinder and having a throughbore,
      a lower sleeve coupled to the lower helical slot of the helical slot cylinder and having a throughbore; wherein the upper sleeve and the lower sleeve are disposed within the throughbore of the helical slot cylinder;
      a weighted component directly or indirectly coupled to the upper sleeve, and
      a flapper assembly directly or indirectly coupled to the lower sleeve;
   applying pressure to the weighted component to push it against gravity thereby pulling the upper sleeve with the weighted component and rotating the helical slot cylinder in a first direction; wherein rotation of the helical slot cylinder also extends the lower sleeve out of the helical slot cylinder, and
   inducing a flapper of the flapper assembly to open through the extending of the lower sleeve out of the helical slot cylinder.

2. The method of claim 1, further comprising:
   removing the pressure to the weighted component to release the weighted component; whereby releasing the weighted component pushes the upper sleeve into the helical slot cylinder thereby rotating the helical slot cylinder in a second direction that is opposite of the first direction.

3. The method of claim 2, wherein rotating the helical slot cylinder in the second direction pulls the lower sleeve into the helical slot cylinder and induces a closing of the flapper of the flapper assembly.

4. The method of claim 1, wherein the safety valve is installed in a storage well.

5. The method of claim 1, wherein the safety valve does not comprise a spring.

* * * * *